United States Patent
Rico Alvarino et al.

(10) Patent No.: US 11,252,707 B2
(45) Date of Patent: Feb. 15, 2022

(54) HARQ AND CONTROL CHANNEL TIMING FOR ENHANCED MACHINE TYPE COMMUNICATIONS (EMTC)

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, Beijing (CN); Madhavan Srinivasan Vajapeyam, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/788,790

(22) Filed: Feb. 12, 2020

(65) Prior Publication Data

US 2020/0187198 A1 Jun. 11, 2020

Related U.S. Application Data

(62) Division of application No. 15/246,082, filed on Aug. 24, 2016, now Pat. No. 10,602,488.

(Continued)

(51) Int. Cl.
*H04W 72/04* (2009.01)
*H04L 1/18* (2006.01)
(Continued)

(52) U.S. Cl.
CPC .......... *H04W 72/0413* (2013.01); *H04L 1/08* (2013.01); *H04L 1/1861* (2013.01);
(Continued)

(58) Field of Classification Search
CPC . H04W 72/0413; H04W 4/70; H04W 72/042; H04L 1/08; H04L 1/1861; H04L 5/0053; H04L 5/14; H04L 5/16
See application file for complete search history.

(56) References Cited

U.S. PATENT DOCUMENTS

| 9,374,845 B2 | 6/2016 | Xu et al. |
| 10,602,488 B2 | 3/2020 | Rico Alvarino et al. |

(Continued)

FOREIGN PATENT DOCUMENTS

| CN | 104811283 A | 7/2015 |
| RU | 2533188 C2 | 11/2014 |

(Continued)

OTHER PUBLICATIONS

Ericsson: "Paging Mechanism for Rel-13 Low Complexity and Coverage Enhanced UEs", 3GPP Draft, R2-153718, Mobile Competence Centre, 650, Route Des Lucioles, F-06921 SO, vol. RAN WG2, No. Beijing, P.R. China, Aug. 24, 2015-Aug. 28, 2015, (Aug. 15, 2015), XP050993713, URL:http://www.3gpp.org/ftp/tsg_ran/WG2_RL2/TSGR2_91/Docs/.*

(Continued)

*Primary Examiner* — Shukri Taha
(74) *Attorney, Agent, or Firm* — Patterson & Sheridan, LLP

(57) ABSTRACT

Aspects of the present disclosure provide hybrid automatic repeat request (HARQ) techniques for enhanced machine type communication (eMTC). In one aspect, a method is provided which may be performed by a wireless device such as a user equipment (UE) for determining a HARQ ID. The method generally includes determining a HARQ ID based, at least in part, on a coverage enhancement (CE) level, and performing a HARQ process timeline based, at least in part, on the determined HARQ ID. Another method is provided for determining a subframe to transmit feedback. The (Continued)

method generally includes determining at least one subframe to transmit a physical uplink control channel (PUCCH) to acknowledge one or more downlink transmissions based, at least in part, on availability of uplink subframes following one or more downlink subframes carrying the downlink transmissions to be acknowledged and transmitting the PUCCH in the determined at least one subframe.

20 Claims, 11 Drawing Sheets

Related U.S. Application Data

(60) Provisional application No. 62/245,230, filed on Oct. 22, 2015.

(51) Int. Cl.
| | | |
|---|---|---|
| *H04L 1/08* | (2006.01) | |
| *H04W 4/70* | (2018.01) | |
| *H04L 5/00* | (2006.01) | |
| *H04L 5/14* | (2006.01) | |
| *H04L 5/16* | (2006.01) | |

(52) U.S. Cl.
CPC ............. *H04L 5/0053* (2013.01); *H04W 4/70* (2018.02); *H04W 72/042* (2013.01); *H04L 5/14* (2013.01); *H04L 5/16* (2013.01)

(56) References Cited

U.S. PATENT DOCUMENTS

| | | | |
|---|---|---|---|
| 2012/0218935 A1 | 8/2012 | Zhang et al. | |
| 2015/0131564 A1 | 5/2015 | Seo et al. | |
| 2015/0282208 A1* | 10/2015 | Yi | H04L 1/1861 370/329 |
| 2016/0249331 A1* | 8/2016 | Park | H04L 1/08 |
| 2016/0278054 A1* | 9/2016 | You | H04W 4/70 |
| 2017/0041904 A1 | 2/2017 | Suzuki et al. | |
| 2017/0180098 A1 | 6/2017 | You et al. | |
| 2017/0272322 A1* | 9/2017 | You | H04W 72/042 |
| 2017/0311294 A1* | 10/2017 | Kim | H04L 1/0045 |
| 2018/0054291 A1* | 2/2018 | Yi | H04W 72/0406 |
| 2018/0255542 A1 | 9/2018 | Seo et al. | |

FOREIGN PATENT DOCUMENTS

| | | |
|---|---|---|
| WO | 2012043524 A1 | 4/2012 |
| WO | 2013162203 A1 | 10/2013 |
| WO | 2013173814 A1 | 11/2013 |
| WO | 2015057028 A1 | 4/2015 |
| WO | 2015130005 A1 | 9/2015 |
| WO | 2015133778 A1 | 9/2015 |

OTHER PUBLICATIONS

Ericsson: "PUCCH Physical Resource Mapping for MTC", 3GPP Draft, R1-153735, PUCCH Physical Resource Mapping for MTC, 3rd Generation Partnership Project (3GPP), Mobile Competence Centre, 650, Route Des Lucioles, F-06921, Sophia-Antipolis Cedex, France, vol. RAN WG1, No. Beijing, China, Aug. 24, 2015-Aug. 28, 2015, Aug. 23, 2015, XP051001183, Retrieved from the Internet: URL:http://www.3gpp.org/ftp/Meetings_3GPPSYNC/RAN1/Docs/.

Intel Corporation: "Remaining Details of Physical Channel Time-Frequency Relationships", 3GPP Draft, R1-155297—Intel MTC TFREL, 3rd Generation Partnership Project (3GPP), Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Oct. 4, 2015 (Oct. 4, 2015), XP051002239, Retrieved from the Internet: URL:http://www.3gpp.org/ftp/Meetings_3GPP_SYNC/RAN1/Docs/.

International Preliminary Report on Patentability—PCT/US2016/048639, The International Bureau of WIPO—Geneva, Switzerland, dated May 3, 2018.

International Search Report and Written Opinion—PCT/US2016/048639—ISA/EPO—dated Mar. 20, 2017.

Qualcomm Incorporated: "Physical Channel Time and Frequency Relationship", 3GPP Draft, R1-155704, Physical Channel Time and Frequency Relationship, 3rd Generation Partnership Project (3GPP), Mobile Competence Centre, 650, Route Des Lucioles, F-06921, Sophia-Antipolis Cedex, vol. RAN WG1, No. Malmo, Sweden, Oct. 5, 2015-Oct. 9, 2015, Oct. 4, 2015 (Oct. 4, 2015), XP051002533,Retrieved from the Internet: URL:http://www.3gpp.org/ftp/Meetings_3GPP_SYNC/RAN1/Docs/.

Renesas Mobile Europe Ltd: "HARQ Procedure for Half Duplex Mode in CC Specific TDD Configuration", 3GPF Draft, R1-120369, 3rd Generation Partnership Project (3GPP), Mobile Competence Centre, 650, Route Des Lucioles, F-06921 Sophia-Antipolis Cedex, France, vol. RAN WG1, No. Dresden, Germany, Feb. 6, 2012-Feb. 10, 2012, Jan. 31, 2012 (Jan. 31, 2012), XP050562872.

Samsung: "DL/UL HARQ timing for low cost MTC UEs in Enhanced Coverage", 3GPP Draft, R1-155425, DLUL HARQ Timing for EMTC Final, 3rd Generation Partnership Project (3GPP), Mobile Competence Centre, 650, Route Des Lucioles, F-06921, Sophia-Antipolis Cedex, France, vol. RAN WG1, No. Malmo, Sweden, Oct. 5, 2015-Oct 89, 2015, Oct. 4, 2015, XP051002331, Retrieved from the Internet: URL:http://www.3gpp.org/ftp/Meetings_3GPP_SYNC/RAN1/Docs/.

Ericsson: "M-PDCCH-Based PUCCH Resource Allocation for MTC", 3GPP TSG-RAN WG1#82, R1-153736, URL:http://www.3gpp.org/ftp/tsg_ran/WG1_RL1/TSGR1_82/Docs/R1-153736.zip , Beijing, China, Aug. 24-28, 2015, 3 Pages.

* cited by examiner

HARQ AND CONTROL CHANNEL TIMING FOR ENHANCED MACHINE TYPE COMMUNICATIONS (EMTC)

CROSS-REFERENCE TO RELATED APPLICATION & PRIORITY CLAIM

This application is a divisional of U.S. patent application Ser. No. 15/246,082, filed Aug. 24, 2016, which claims benefit of and priority to U.S. Provisional Application Ser. No. 62/245,230, filed Oct. 22, 2015, both of which are herein incorporated by reference in their entirety for all applicable purposes.

BACKGROUND

Field of the Disclosure

Certain aspects of the present disclosure generally relate to wireless communications and, more particularly, to hybrid automatic repeat request (HARQ) timing for HARQ process identification (ID) determination and control channel timing for enhanced machine type communication(s) (eMTC).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication(s) (MTC) UEs, which may include remote devices, that may communicate with a base station, another remote device, or some other entity. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Techniques and apparatus are provided herein for hybrid automatic repeat request (HARQ) timing for HARQ process identification (ID) determination and control channel timing for enhanced machine type communication (eMTC).

Certain aspects of the present disclosure provide a method, performed by a user equipment (UE). The method generally includes determining a HARQ ID based, at least in part, on a coverage enhancement (CE) level, and performing a HARQ process timeline based, at least in part, on the determined HARQ ID.

Certain aspects of the present disclosure provide a method, performed by a UE. The method generally includes determining at least one subframe to transmit a physical uplink control channel (PUCCH) to acknowledge one or more downlink transmissions based, at least in part, on availability of uplink subframes following one or more downlink subframes carrying the downlink transmissions to be acknowledged, and transmitting the PUCCH in the determined at least one subframe.

Certain aspects of the present disclosure provide a method, performed by a UE. The method generally includes determining a set of possible starting subframes for monitoring a machine type communication physical downlink control channel (MPDCCH) based, at least in part, on a current subframe number, a pattern of available subframe numbers, and repetition levels of the MPDCCH, and monitoring the MPDCCH in one or more subframes of the set of possible starting subframes.

Certain aspects of the present disclosure provide an apparatus, such as a UE. The apparatus generally includes means for determining at least one subframe to transmit a PUCCH to acknowledge one or more downlink transmissions based, at least in part, on availability of uplink subframes following one or more downlink subframes carrying the downlink transmissions to be acknowledged, and means for transmitting the PUCCH in the determined at least one subframe.

Certain aspects of the present disclosure provide an apparatus, such as a UE. The apparatus generally includes means for determining a set of possible starting subframes for monitoring a MPDCCH based, at least in part, on a current subframe number, a pattern of available subframe numbers, and repetition levels of the MPDCCH, and means for monitoring the MPDCCH in one or more subframes of the set of possible starting subframes.

Certain aspects of the present disclosure provide an apparatus, such as a UE. The apparatus generally includes at least one processor configured to determine at least one subframe to transmit a PUCCH to acknowledge one or more downlink transmissions based, at least in part, on availability of uplink subframes following one or more downlink subframes carrying the downlink transmissions to be acknowledged, and transmit the PUCCH in the determined at least one subframe; and a memory coupled with the at least one processor.

Certain aspects of the present disclosure provide an apparatus, such as a UE. The apparatus generally includes at least one processor configured to determine a set of possible starting subframes for monitoring a MPDCCH based, at least in part, on a current subframe number, a pattern of available subframe numbers, and repetition levels of the MPDCCH, and monitor the MPDCCH in one or more subframes of the set of possible starting subframes; and a memory coupled with the at least one processor.

Certain aspects of the present disclosure provide computer readable medium having computer-executable code stored thereon for wireless communications by a UE. The computer-executable code generally includes code for determining at least one subframe to transmit a PUCCH to acknowledge one or more downlink transmissions based, at least in part, on availability of uplink subframes following one or more downlink subframes carrying the downlink transmissions to be acknowledged, and code for transmitting the PUCCH in the determined at least one subframe.

Certain aspects of the present disclosure provide computer readable medium having computer-executable code stored thereon for wireless communications by a UE. The computer-executable code generally includes code for determining a set of possible starting subframes for monitoring a MPDCCH based, at least in part, on a current subframe number, a pattern of available subframe numbers, and repetition levels of the MPDCCH, and code for monitoring the MPDCCH in one or more subframes of the set of possible starting subframes.

Numerous other aspects are provided including methods, apparatus, systems, computer program products, computer-readable medium, and processing systems. To the accomplishment of the foregoing and related ends, the one or more aspects comprise the features hereinafter described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
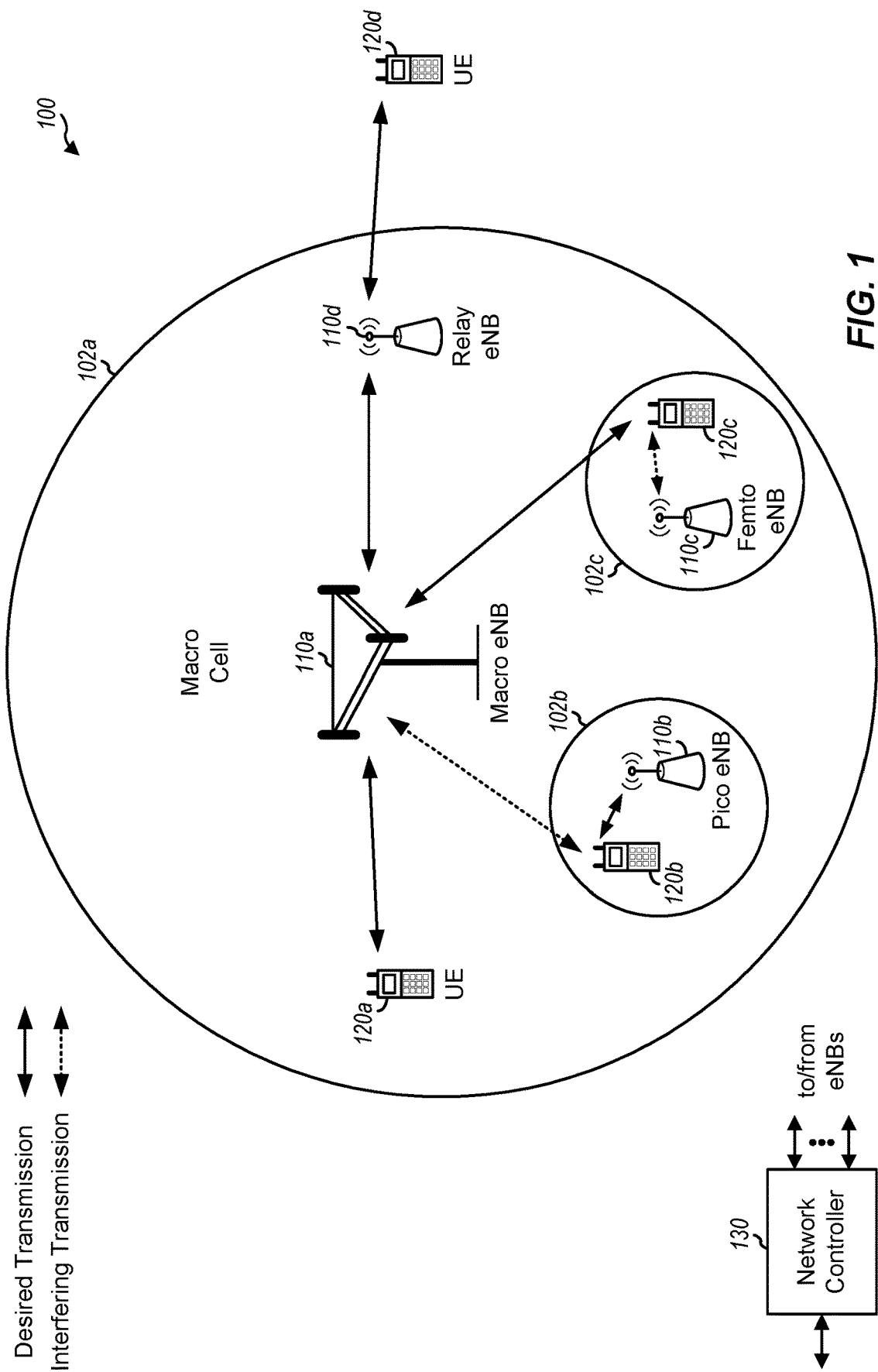
FIG. 1 is a block diagram conceptually illustrating an example of a wireless communication network, in accordance with certain aspects of the present disclosure.

Aspects of the present disclosure provide hybrid automatic repeat request (HARQ) timing for HARQ process identification (ID) determination for enhanced machine type communication (eMTC). eMTC may be used for communications by devices with limited communication resources, such as MTC devices (e.g., low cost MTC devices or low cost eMTC devices). MTC devices may be implemented as IoT (Internet of Things) devices, such as narrowband IoT (NB-IoT) devices. The low cost MTC devices may co-exist with legacy devices in a particular radio access technology (RAT), such as long term evolution (LTE), for example, and may operate on one or more narrowband regions partitioned out of a wider available system bandwidth that is supported by the particular RAT. The low cost MTC devices may also support different modes of operation, such as a coverage enhanced (CE) mode (e.g., where repetitions of the same message may be bundled or transmitted across multiple subframes), a normal coverage mode (e.g., where repetitions may not be transmitted), etc.

Accordingly, as will be described in more detail below, the techniques presented herein may allow for, a user equipment (UE) to determine the HARQ ID based, at least in part, on a coverage enhancement (CE) level of the UE. In aspects, the UE may determine at least one subframe in which to transmit a physical uplink control channel (PUCCH) to acknowledge one or more downlink transmissions. The UE may determine the at least one subframe based, at least in part, on availability of uplink subframes following one or more downlink subframes carrying the downlink transmissions to be acknowledged. According to certain aspects, the UE may determine a set of possible starting subframes for monitoring an MPDCCH occasion based on a current subframe number, a pattern of available subframe numbers, and repetition levels of the MPDCCH.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, smart ring, smart clothing), entertainment devices (e.g., music players, gaming devices), cameras, navigation/location determination devices, healthcare/medical devices, vehicular devices, etc. Some UEs may be considered machine-type communication (MTC) UEs, which may include remote devices, such as drones, robots/robotic devices, sensors, meters, monitoring devices, security devices, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

It is noted that while aspects may be described herein using terminology commonly associated with 3G and/or 4G wireless technologies, aspects of the present disclosure can be applied in other communication systems, such as 5G and later.

FIG. 1 illustrates an example wireless communication network 100, in which aspects of the present disclosure may be practiced. For example, techniques presented herein may be used to provide hybrid automatic repeat request (HARQ) timing for HARQ process identification (ID) determination for enhanced machine type communication (eMTC), performed by a wireless device. A UE 120 (e.g., which may be a low cost UE, MTC UE, or IoT device) may determine a HARQ ID based on a coverage enhancement (CE) level of the UE and may perform a HARQ process timeline with the eNB 110 based on the determined HARQ ID. According to certain aspects, the UE 120 may determine at least one subframe to transmit a physical uplink control channel (PUCCH) to acknowledge one or more downlink transmissions based, at least in part, on availability of uplink subframes following one or more downlink subframes carrying the downlink transmissions to be acknowledged. According to certain aspects, the UE 120 can determine a set of possible starting subframes for monitoring a machine type communication physical downlink control channel (MPDCCH) based, at least in part, on a current subframe number, a pattern of available subframe numbers, and repetition levels of the MPDCCH.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a lost UE, MTC UE, IoT device, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost, low data rate devices, e.g., such as low cost MTC UEs, low cost eMTC UEs, etc. The low cost UEs may co-exist with legacy and/or advanced UEs in the LTE network and may have one or more capabilities that are limited when compared to the other UEs (e.g., non-low cost UEs) in the wireless network. For example, when compared to non-low cost UEs in the LTE network, the low cost UEs may operate with one or more of the following: a reduction in maximum bandwidth (relative to non-low cost UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as low cost UEs. Similarly, other devices, such as legacy and/or advanced UEs (e.g., in LTE) are referred to generally as non-low cost UEs.

Figure 2:
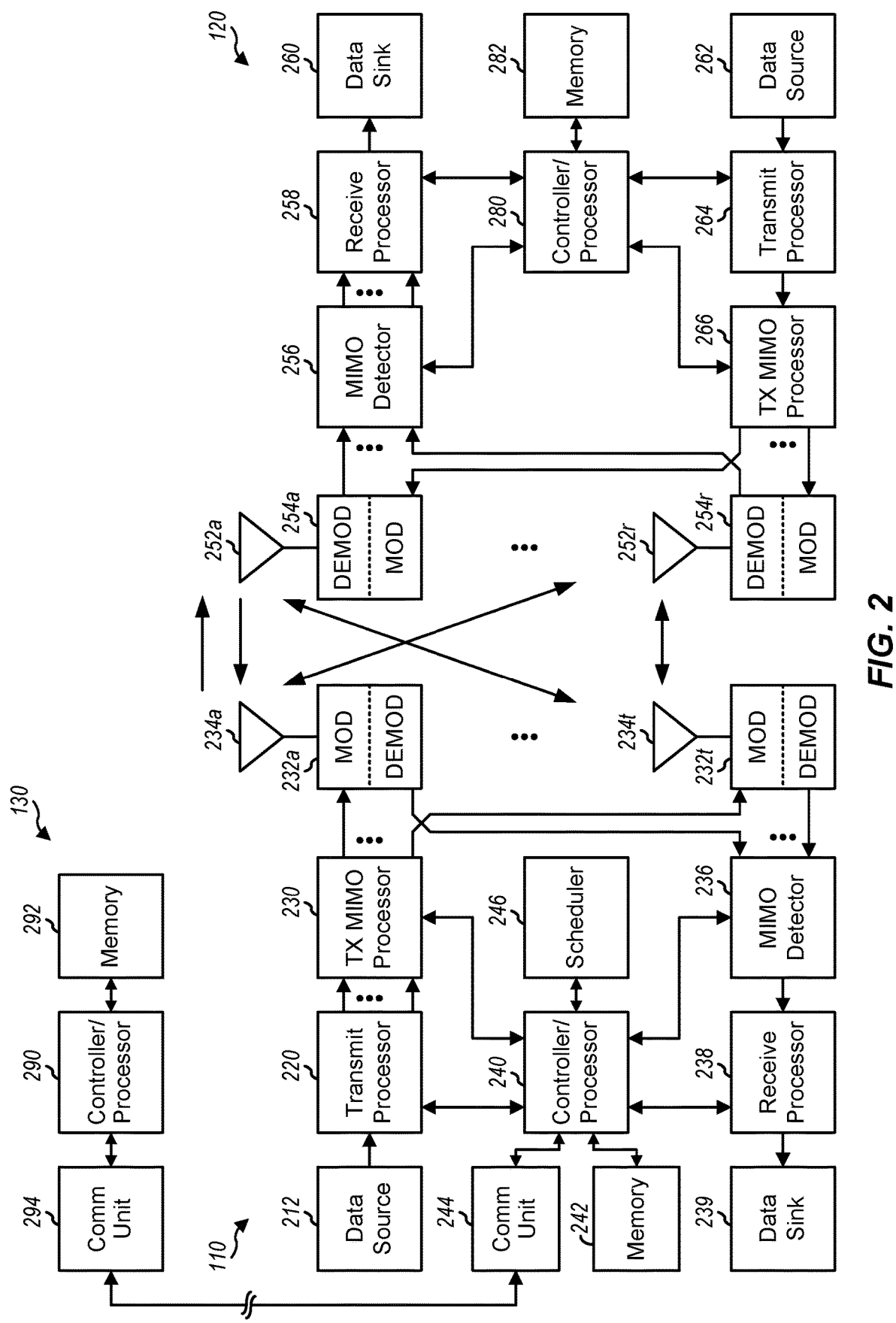
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T 1 and R 1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for HARQ timing for HARQ ID determination for eMTC to use for communications between a UE (e.g., an eMTC UE) and a base station (e.g., an eNodeB). For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120, and/or controller/processor 240 and/or other controllers/processors and modules at BS 110 may perform or direct operations 800, 1000, and 1100 shown in FIGS. 8, 10, and 11, respectively. Memories 242 and 282 may store data and program codes for base station 110 and UE 120, respectively. A scheduler 246 may schedule UEs for data transmission on the downlink and/or uplink.

Figure 3:
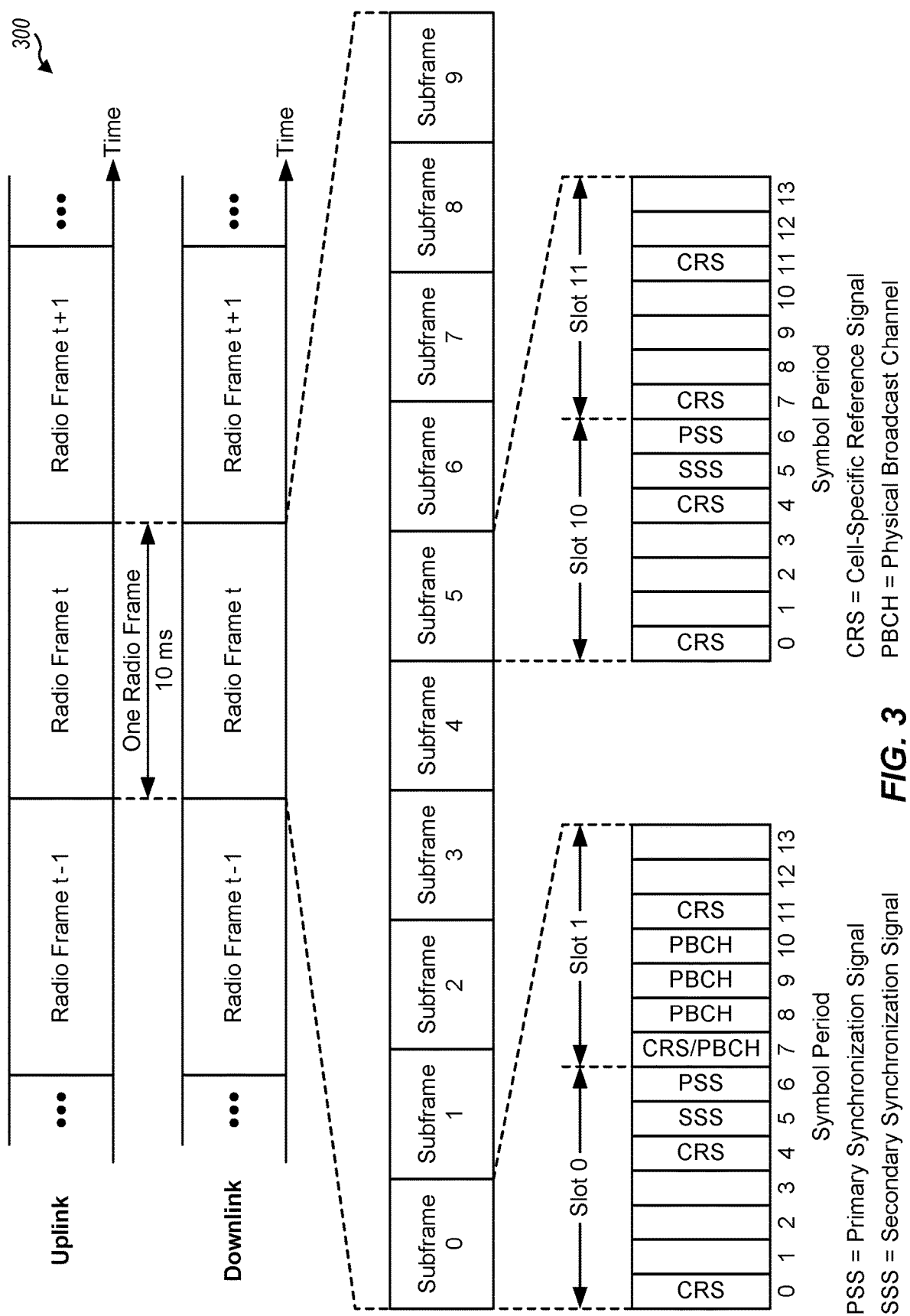
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
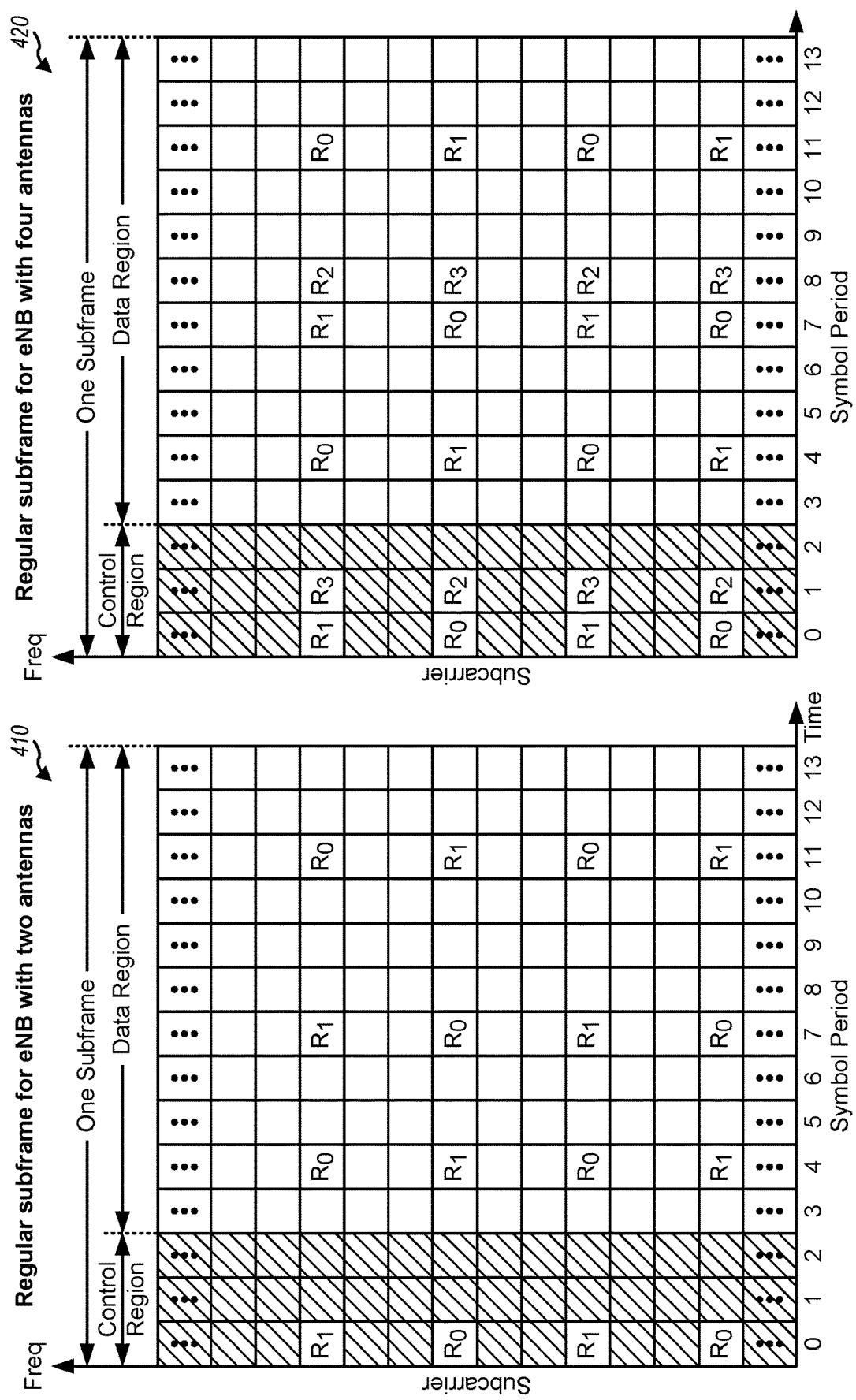
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as low cost UEs, as compared to other (non-low cost) devices in the wireless communication network.

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (e.g., relative to legacy UEs), a single receive radio frequency (RF) chain may be used, peak rate may be reduced (e.g., a maximum of 1000 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
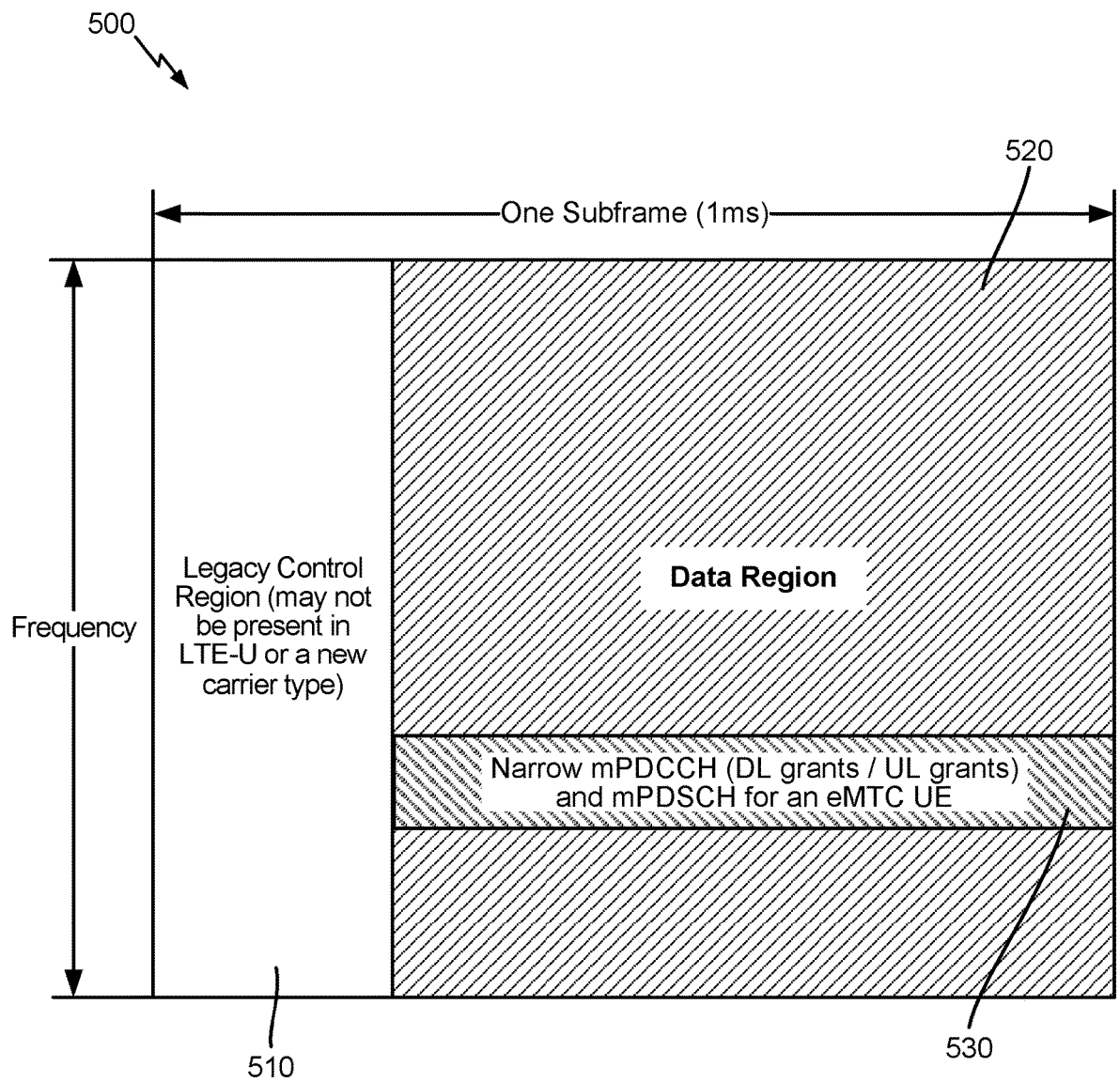
FIG. 5 illustrates an exemplary subframe configuration for enhanced machine type communications (eMTC), in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

As discussed above, certain standards (e.g., long term evolution (LTE) Release 13) may introduce support for various enhancements for machine type communications (MTC), referred to herein as enhanced MTC (eMTC). For example, eMTC may provide MTC devices, such as MTC user equipments (UEs), with coverage enhancements up to 15 dB.

As discussed above, in eMTC, system bandwidth may be divided into narrowband subbands. Each narrowband subband may be 6 resource blocks (RBs). The UE may transmit and receive in one narrowband each subframe. In many cases, for eMTC, bundling may be used for channels. In one mode of operation, referred to herein as coverage enhancement (CE) Mode A, no repetitions or few repetitions may be used. In another mode of operation, CE Mode B, a large number of repetitions may be used.

A starting subframe of an MTC physical downlink control channel (M-PDCCH) UE-specific search space may be configured for enhanced coverage. For UEs in coverage enhancement mode of operation, the repetition level for at least unicast physical downlink shared channel (PDSCH)/physical uplink shared channel (PUSCH) may be dynamically indicated based on a set of values configured by higher layers.

PUSCH hybrid automatic repeat request (HARQ) operation for UEs may be synchronous (e.g., HARQ processes run consecutively), whether operating in coverage enhancement mode or legacy mode. For synchronous operation, the HARQ process ID (HARQ ID) may be calculated implicitly from the subframe number and/or other parameters known beforehand. In downlink HARQ, the HARQ ID may be asynchronous and indicated explicitly in the grant.

Figure 6:
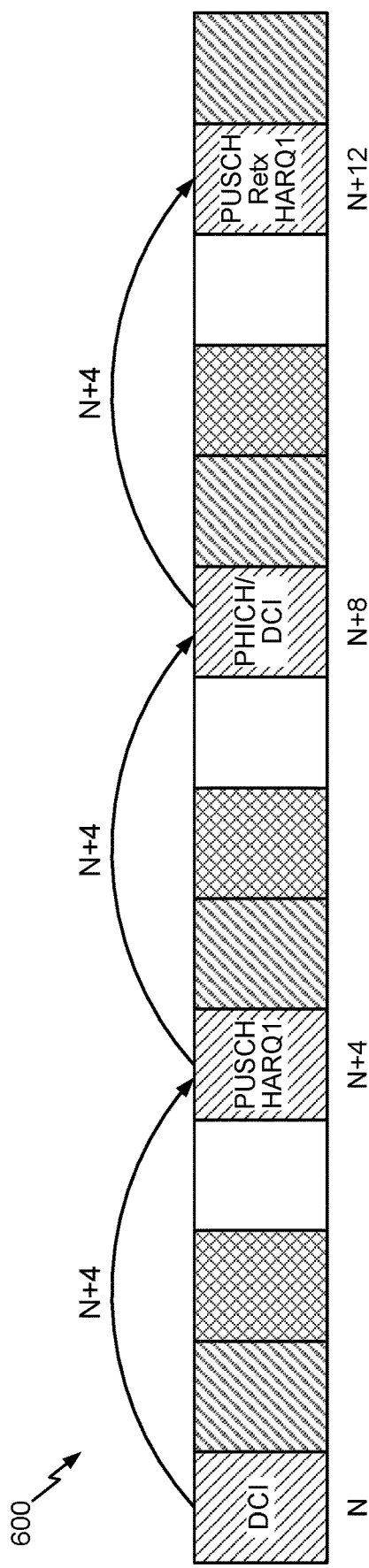
FIG. 6 illustrates an example physical uplink shared channel (PUSCH) hybrid automatic repeat request (HARQ) timeline.

HARQ timing may be different for low cost devices such as eMTC devices than for non-low cost devices. FIG. 6 illustrates an example PUSCH HARQ timeline. As shown in FIG. 6, for example, in legacy LTE, PUSCH HARQ timing is N+4. For example, a grant (e.g., downlink control information (DCI) in a PUCCH) received in subframe N schedules PUSCH (e.g., for a first HARQ process) on subframe N+4; the feedback (e.g., ACK/NACK) for the PUSCH is received in subframe N+8 via a physical HARQ indicator channel (PHICH) or downlink control information (DCI); and a HARQ retransmission for the PUSCH is sent in subframe N+12. In legacy LTE, uplink bundling may be semi-statically configured and, thus, a similar timing relationship can be known beforehand. In aspects, the HARQ numbering changes depending on the radio resource control (RRC) configuration.

Figure 7:
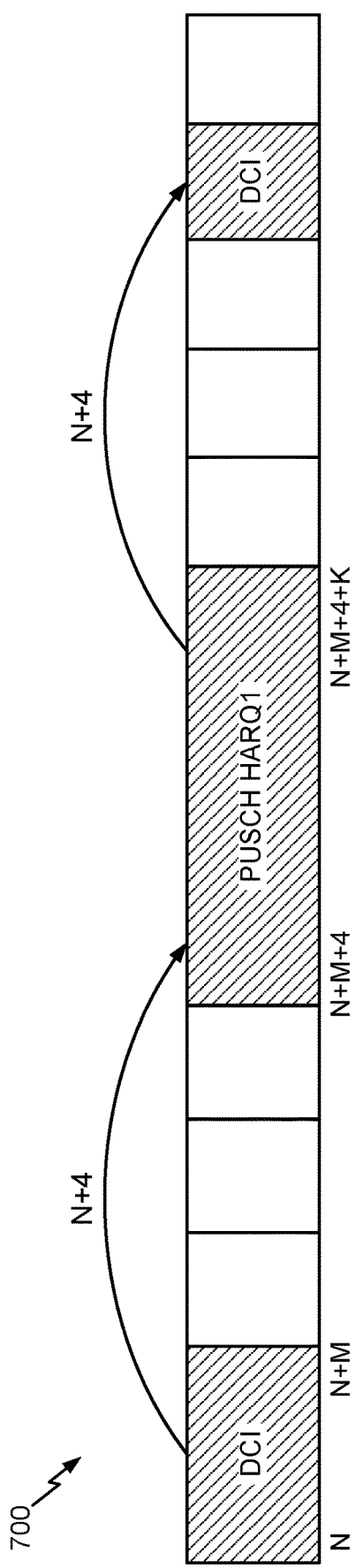
FIG. 7 illustrates an example PUSCH HARQ timeline for eMTC following HARQ timing.

For eMTC, bundling may change dynamically. Thus, the starting point of PUSCH may no longer be aligned, for example, for large CE levels (e.g., larger bundling sizes). If N+4 HARQ timing is used (e.g., the legacy LTE HARQ timing illustrated in FIG. 6), the timing of DCI for retransmission may depend on the PUSCH bundling size and the first DCI bundling size. For example, as shown in FIG. 7, a grant (e.g., a DCI in an MPDCCH) may start in subframe N and finish in subframe N+M (where M is the bundling for the grant). In this case, the grant schedules PUSCH in subframe N+M+4 and the PUSCH transmission may finish in subframe N+M+4+K (where K is the bundling for the PUSCH). Because the values M and K can dynamically change, misalignment may occur between the UE and eNB if the grant is missed.

Therefore, techniques for HARQ for eMTC are desirable. The present disclosure provides techniques and apparatus for HARQ for eMTC, including PUSCH HARQ timing, for HARQ ID determination for eMTC, subframe determination for transmitting PUCCH, and starting MPDCCH subframe determination.

Figure 8:
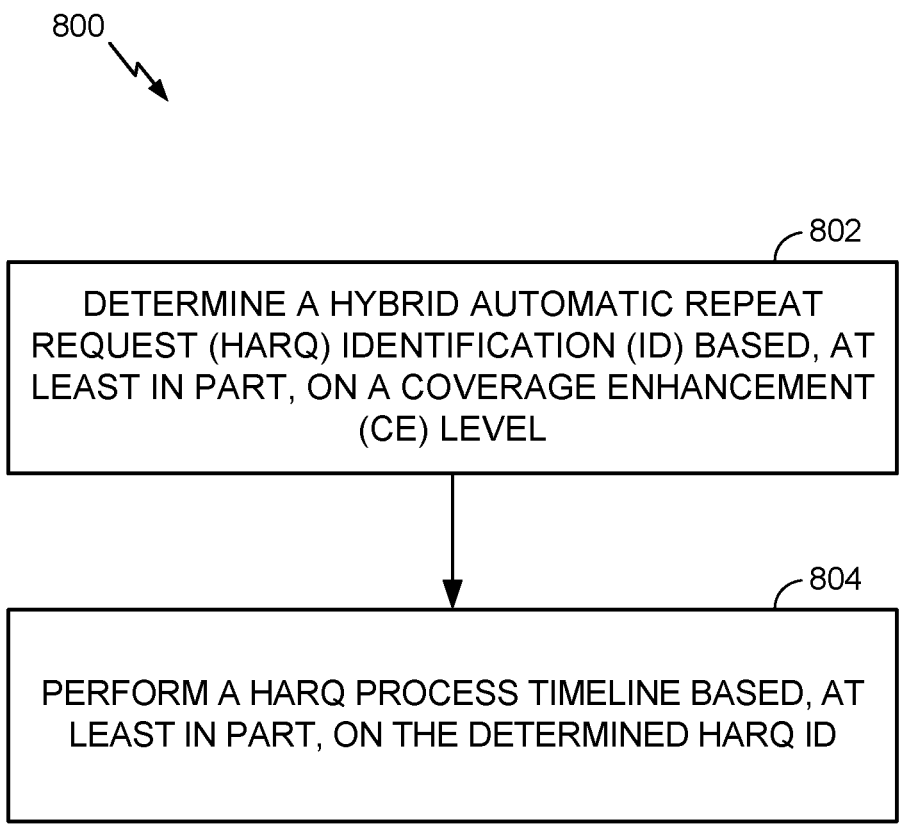
FIG. 8 is a flow diagram illustrating example operations for determining a HARQ ID in wireless communications by a UE, in accordance with certain aspects of the present disclosure.

FIG. 8 is a flow diagram illustrating example operations 800 for wireless communications, in accordance with certain aspects of the present disclosure. The operations 800 may be performed, for example, by a UE (e.g., UE 120). The operations 800 may begin, at 802, by determining a HARQ ID based, at least in part, on a CE level. This CE level may be determined in part from the bundle size for various channels or from explicit signaling (e.g., CE mode A or CE mode B), for example. The determination of the HARQ ID may be further based on a current subframe number, system frame number (SFN), a starting or final subframe for monitoring a MPDCCH or a PUSCH, and/or set of repetition levels for the MPDCCH or PUSCH. According to certain aspects, the parameters used for determining the HARQ ID may change if the CE level changes.

At 804, the UE performs a HARQ process timeline based, at least in part, on the determined HARQ ID. Performing a HARQ process can include, for example, performing a HARQ process based on or according to a HARQ process timeline.

In order to maintain consistent behavior between the UE (e.g., UE 120) and the eNB (e.g., eNB 110), the HARQ number may not depend on previous grants. If the repetition level (e.g., bundling size) is large, it may not be desirable to have a subframe granularity to determine the HARQ ID. For example, MPDCCH may have repetition levels of 4, 8, or 12. Thus, since MPDCCH may never have a repetition level of 1, that HARQ ID may never be used.

According to certain aspects, the UE (e.g., UE 120) may determine HARQ ID based on current subframe, or SFN, and a CE level. For example, in CE Mode A, since there are no repetitions or few repetitions, the UE can determine HARQ ID similar to in legacy systems. For example, the HARQ ID may cycle every 8 subframes for 8 HARQ processes.

In CE Mode B, the UE can perform HARQ ID determination based on a starting subframe for monitoring MPDCCH. For example, if the UE monitors MPDCCH (which may have different repetition levels) every 20 subframes, with 2 HARQ processes, then a grant (e.g., for a HARQ process) in a subframe [0, 19], [40, 59], [80, 99], and so on, may have HARQ ID #0, and a grant (e.g., for a different HARQ process) coming in subframe [20, 39], [60, 79], and so on, may have HARQ ID #1. In general, for the i-th MPDCCH monitoring interval, the HARQ ID can be obtained as i mod N, with N the number of HARQ processes.

Alternatively, the HARQ ID may be based on the starting point and/or the end point of the PUSCH transmission similar to as described above for the MPDCCH starting subframe, for example, similar to legacy for CE Mode A or based on the starting subframe for monitoring the PUSCH for CE Mode B (e.g., i mod N, where i is the i-th PUSCH monitoring interval).

According to certain aspects, a subframe mask may be used for subframe availability. For example, the UE may be configured with a set of DL and UL subframes. To take into account the current subframe and the CE level, the UE may take into account a subframe mask.

According to certain aspects, the UE can switch between determining the HARQ ID based on the legacy timing or based on the monitoring intervals and starting subframe. The switching can be based on the CE level.

According to certain aspects, back-to-back (e.g., consecutive) MPDCCH occasions may be monitored. In this case, HARQ ID may be determined based on the subframe number and the set of MPDCCH repetition levels monitored. For example, if the MPDCCH has repetition levels 1, 2, 4, or 8, then there may be four HARQ IDs. In this case, the HARQ ID may be determined as floor (SF/8) mod 4 (e.g., the HARQ ID is changed every 8 subframes).

For small CE levels, the HARQ ID may be determined as floor (subframe number (SF)/MinR) mod NumHARQ (e.g., cycle the HARQ number each subframe), where MinR is the minimum number of repetitions in the set of repetition levels being monitored and NumHARQ is the number of HARQ processes. For large CE levels, the HARQ ID may be determined as floor (SF/MaxR) mod NumHARQ, where MaxR is the maximum number of repetitions in the set of repetition levels being monitored. Thus, in the example of repetition levels 1, 2, 4, and 8: MinR=1, MaxR=8, and NumHARQ=4.

According to certain aspects, the subframe number may be the starting or ending subframe of MPDCCH or the starting or ending subframe of PUSCH. The MaxR and MinR may be determined from the maximum and minimum bundle size of PUSCH. The determination of the HARQ ID may switch based on the CE level, for example, between based MinR for smaller CE levels (e.g., CE Mode A) and based on MaxR for larger CE levels (e.g., CE Mode B).

HARQ efficiency may be desirable for large bundling sizes (e.g., CE Mode B). In this case, a small number of HARQ processes may be used (e.g., only 2 HARQ processes) so that the HARQ ID may be signaled using only 1 bit.

According to certain aspects, the UE may use (e.g., switch between) synchronous or asynchronous HARQ based on the coverage enhancement level. For example, the UE might use synchronous HARQ in CE Mode B, where only 1 bit in the PUSCH grant is needed to signal the HARQ process number.

For downlink, asynchronous HARQ may be used. As mentioned above, for asynchronous HARQ, the HARQ ID may be transmitted explicitly in the grant and PDSCH is transmitted following the grant. After PDSCH is transmitted in subframe N, PUCCH is transmitted in subframe N+K, where K is known beforehand and might depend on the duplexing configuration (TDD/FDD). For example, as shown in FIG. 6, for legacy LTE, K is equal to 4 subframes. The UE may be signaled a reference for DL and UL subframes (even for FDD).

Figure 9:
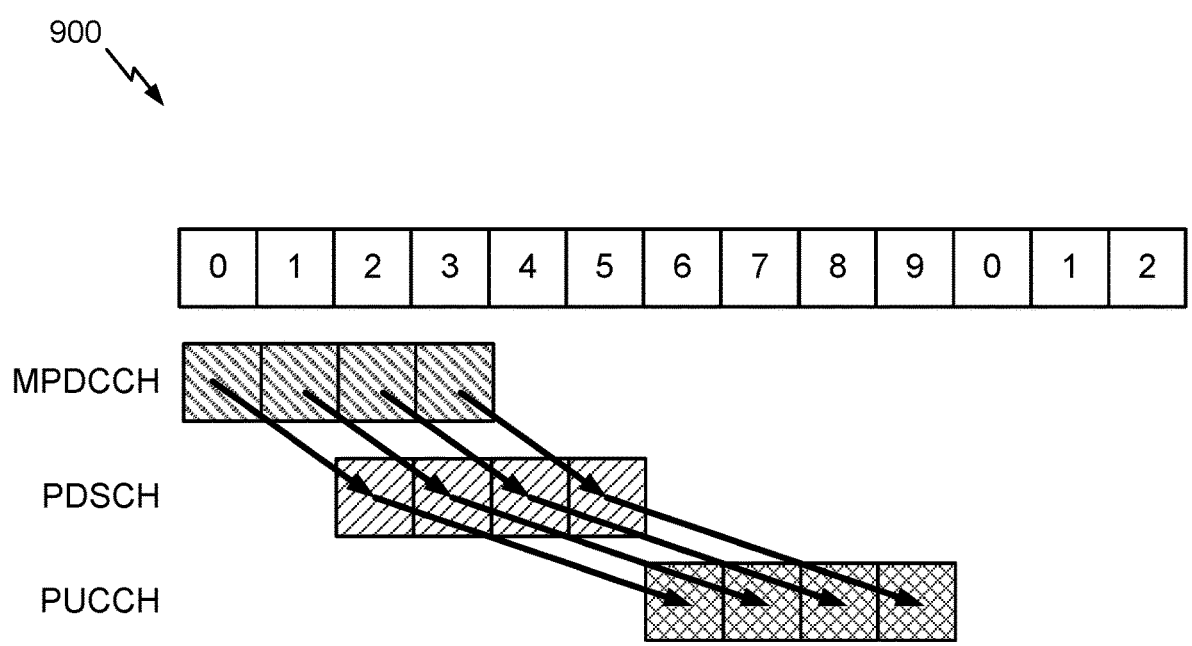
FIG. 9 illustrates an example subframe usage for a UE operating in half-duplex frequency division duplexing (HD-FDD), in accordance with certain aspects of the present disclosure.

For DL, same-subframe scheduling may not be available. The MPDCCH (e.g., the grant) may be transmitted in subframes #0, 1, 2, 3 (e.g., four repetitions) and a PDSCH is scheduled in subframe N+2 (e.g., subframes #2, 3, 4, 5). Since same-subframe scheduling is not used, the feedback for the PDSCH transmissions may begin only after all of the PDSCH transmissions are completed. Thus, the feedback may be in subframes #6, 7, 8, 9. This may decrease the peak data for a UE in good coverage, for example for half-duplex (HD) FDD. As shown in FIG. 9, for HD-FDD, only four out often subframes may be used for the data (e.g., PDSCH) due to the timing constraints of the HARQ process.

Figure 10:
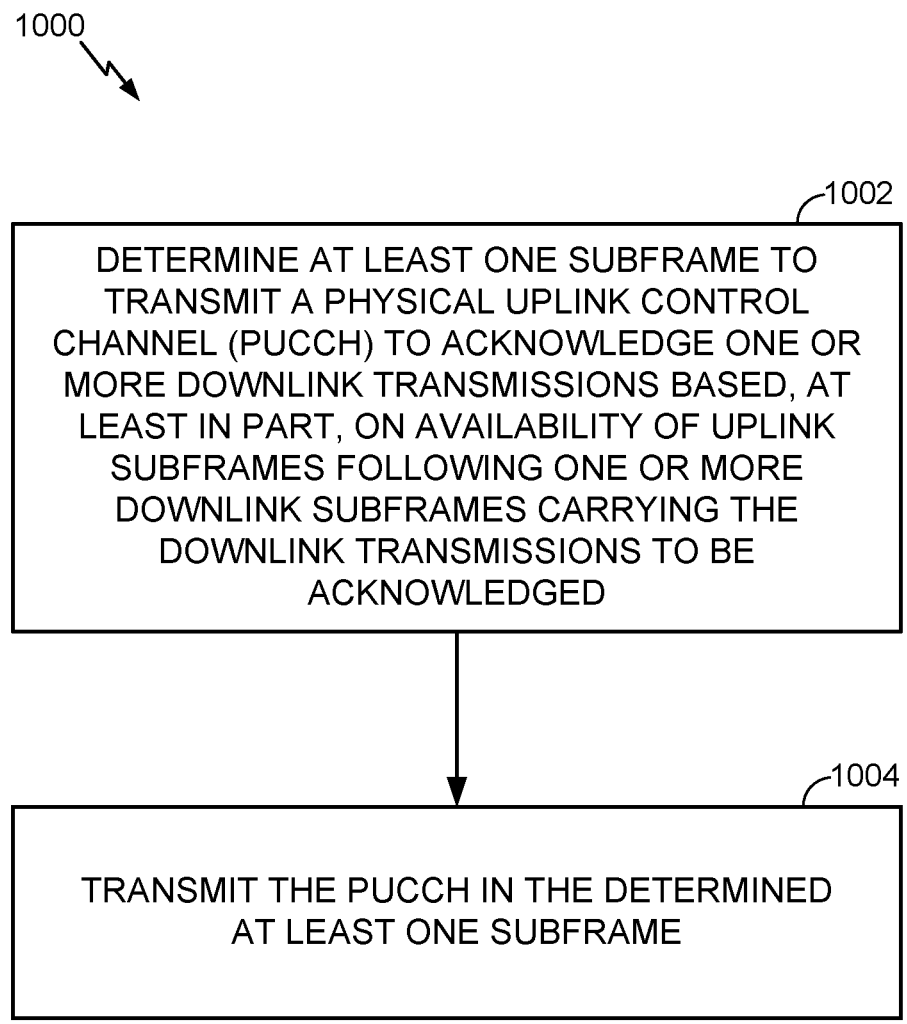
FIG. 10 is a flow diagram illustrating example operations for control channel timing in wireless communications by a UE, in accordance with certain aspects of the present disclosure.

FIG. 10 is a flow diagram illustrating example operations 1000 for determining a starting subframe for transmitting feedback (e.g., PUCCH), in accordance with certain aspects of the present disclosure. The operations 1000 may include operations performed by a UE (e.g., UE 120). For example, the operations 1000 may begin, at 1002, by determining at least one subframe to transmit a PUCCH to acknowledge one or more downlink transmissions based, at least in part, on availability of uplink subframes following one or more downlink subframes carrying the downlink transmissions to be acknowledged. At 1004, the UE transmits the PUCCH in the determined at least one subframe.

The UE may be configured with a set of UL and DL subframes. According to certain aspects, the UE may transmit PUCCH in the first available subframe after N+K. For example, the PUCCH carrying feedback for a PDSCH in subframe N may be transmitted in the first configured UL subframe (e.g., available) after a configured number of subframes K for the HARQ procedure. Feedback in the first available subframe can be provided for multiple PDSCH having the same PUCCH. For example, the feedback may include only one bit for all of the feedback (e.g., a single bit for the multiple PDSCH), one bit for each group of PDSCH, or one bit for each of the multiple PDSCH. In an illustrative example, based on FIG. 9, subframe #9 may be the first available uplink subframe. Data may be transmitted in subframes #2-8 and the feedback for all of the PDSCH may be transmitted in the UL subframe #9. Thus, in contrast to the previous example shown in FIG. 9, seven out of ten subframes may be used for data.

In some cases, it may be desirable to have uplink subframes for uplink data transmissions (e.g., PUSCH). Rather than the using the first available UL subframe for PUCCH, the UE may be signaled a set of available subframes for DL, a set of available subframes for UL PUSCH, and a set of available subframes for UL PUCCH. In this case, rather than transmitting the PUCCH in the first available uplink subframe after N+K, the UE can transmit the PUCCH in the first UL available subframe for PUCCH from the signaled set of subframes for UL PUCCH after N+K. The feedback in that subframe can include feedback for multiple PDSCH as described above. PUSCH can be transmitted in the signaled set of subframes available for UL PUSCH.

According to certain aspects, the HARQ timing may depend on the UE capability (e.g., full-duplex or half-duplex). For example, if the UE is configured for full-duplex operation, then PUCCH may be transmitted in subframe N+K, according to legacy LTE HARQ timing. Since the UE can transmit and receive at the same time in FD operation. If the UE is configured half-duplex operation, then the PUCCH may be transmitted in the first available subframe after N+K following the uplink pattern (or PUCCH mask) as described above based on the first available U subframe of configured set of UL/DL subframes or based on the signaled sets of subframes available for DL, UL PUCCH, and UL PUSCH.

According to certain aspects, for an initial message interchange, where the eNB does not know if the UE is configured for full-duplex operation or for half-duplex operation, the UE may use a worst case configuration (e.g., half-duplex).

According to certain aspects, the UE may know (e.g., determine) a starting subframe of a MPDCCH occasion to start monitoring for MPDCCH. According to certain aspects, the starting subframe for an MPDCCH occasion may be determined based on subframe number, pattern of available subframe numbers, and MPDCCH repetition levels. All repetition levels may have a common starting point. The UE may restart its subframe counter after a number of radio frames.

Figure 11:
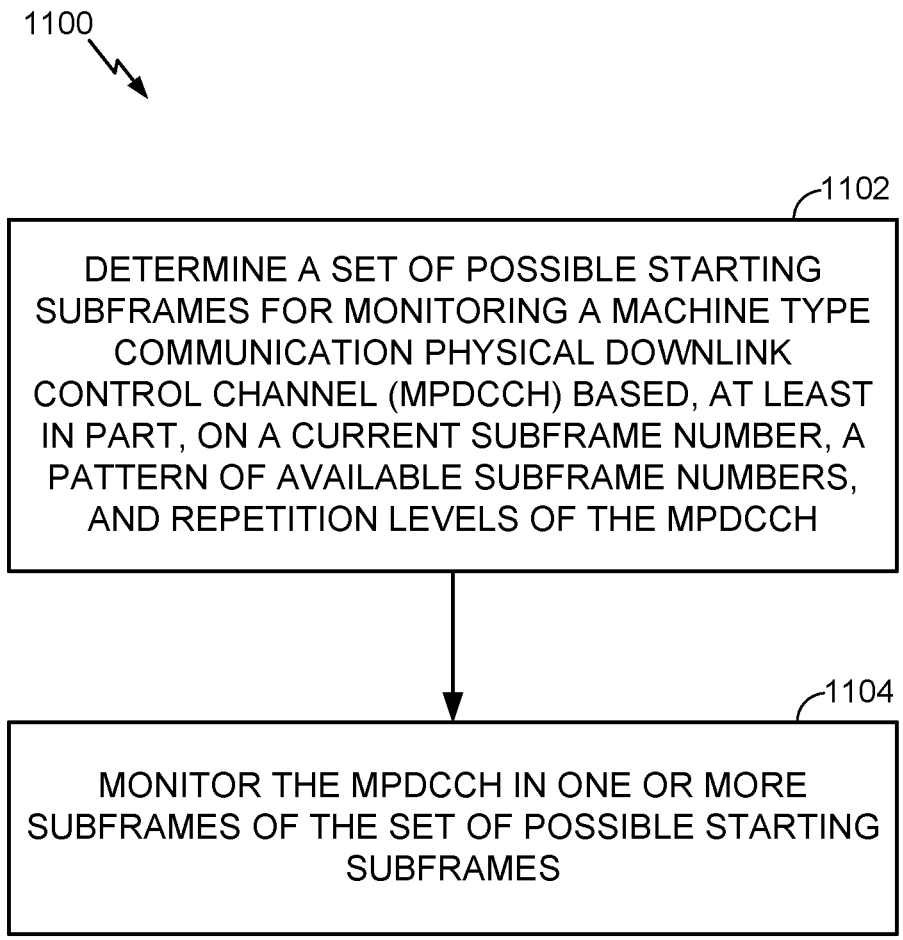
FIG. 11 is a flow diagram illustrating example operations for determining a starting subframe for monitoring for a MTC physical downlink control channel (MPDCCH) in wireless communications by a UE, in accordance with certain aspects of the present disclosure.

FIG. 11 is a flow diagram illustrating example operations 1100 for determining a starting subframe for monitoring MPDCCH, in accordance with certain aspects of the present disclosure. The operations 1100 may include operations performed by a UE (e.g., UE 120). For example, the operations 1100 may begin, at 1102, by determining a set of possible starting subframes for monitoring a MPDCCH based, at least in part, on a current subframe number, a pattern of available subframe numbers, and repetition levels of the MPDCCH. At 1104, the UE monitors the MPDCCH in one or more subframes of the set of possible starting subframes.

Figure 12:
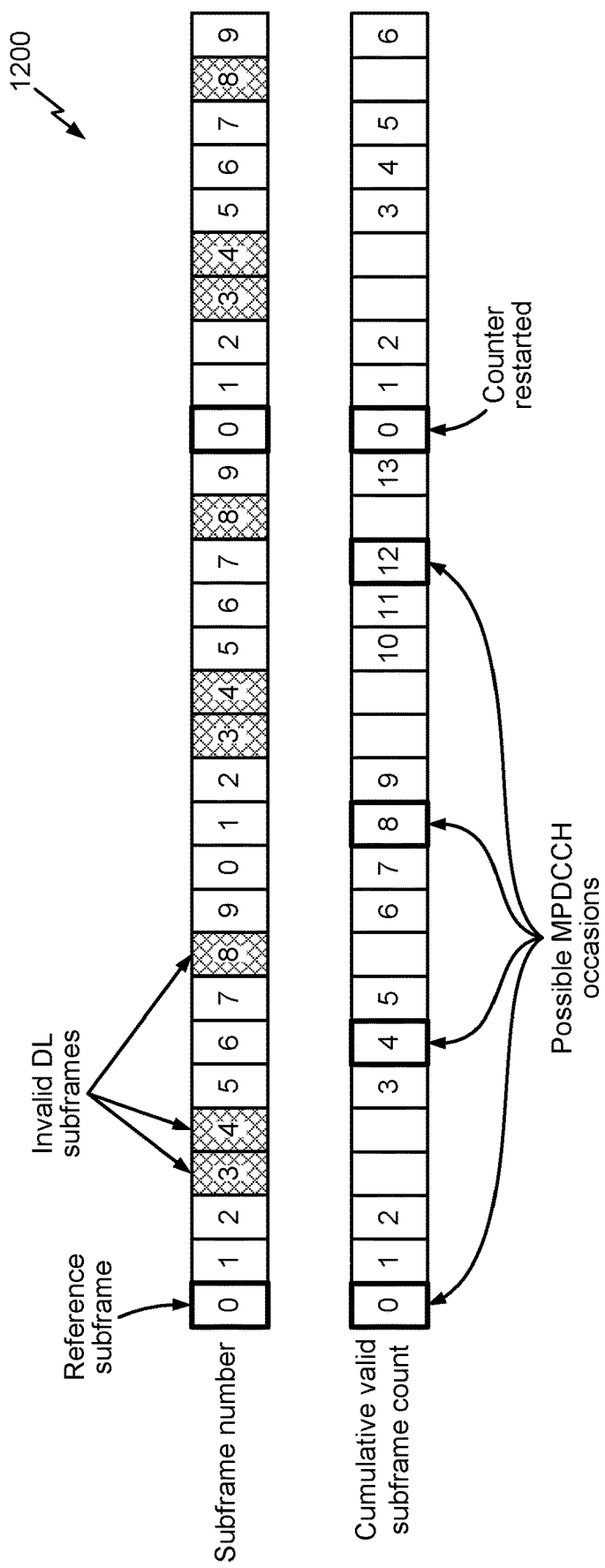
FIG. 12 is an example transmission timeline illustrating possible starting subframes for monitoring for a MPDCCH, in accordance with certain aspects of the present disclosure.

According to certain aspects, the starting subframe for monitoring an MPDCCH occasion may be determined based on subframe number, available subframe numbers, and MPDCCH repetition level. There may be a common starting subframe for all repetition levels. FIG. 12 is an example transmission timeline 1200 illustrating possible starting subframes for monitoring for a MPDCCH. In one example implementation, the UE may be configured to monitor MPDCCH repetition levels of 1, 2, and 4. The subframe configuration in this example may be that all downlink subframes are valid except subframes #3, 4, and 8 in every radio frame (e.g., signaled as 1, 1, 0, 1, 1, 1, 1, 1, 1, 1), as shown in FIG. 12.

The subframe #0 may be signaled as a reference subframe. The reference subframe may be defined with respect to an absolute frame boundary (e.g., every 40 radio frames). The reference subframe may be determined explicitly (e.g., defined in the specifications). Alternatively, the reference subframe may be a function of the downlink subframe pattern, for example, the number of valid downlink subframes in a period. In yet another alternative, the reference subframe may be a function of maximum coverage enhancement level supported, for example, the maximum MPDCCH repetition level. According to certain aspects, if two MPDCCH regions collide (e.g., just before a reference subframe), some of the candidates may not be valid.

Starting from the reference subframe (e.g., subframe #0), the UE may count the valid available downlink subframes (e.g., not counting the invalid subframes). The UE may determine the valid subframe corresponding to the largest MPDCCH repetition level as the starting subframe for monitoring the MPDCCH. In the example illustrated in FIG. 12, the UE may determine every fourth valid subframe, subframes #0 and 6 in the first frame and subframe #1 in the second frame, as the starting subframes for monitoring the MPDCCH occasion.

In the example shown in FIG. 12, the reference subframe occurs every 2 radio frames (at subframe #0). As mentioned above, subframes #3, 4, and 8 may be invalid. As shown in FIG. 12, the starting MPDCCH opportunity at the twelfth valid subframe, subframe #7 of the second radio frame, may include only three subframes before the counter restart at the next reference subframe (e.g., subframe #0 of the third radio frame shown). In this case, a repetition level of four may not be supported or no monitoring may be performed in that opportunity.

According to certain aspects, the UE may determine the starting point for MPDCCH monitoring in a two-step process. The UE may determine a set of possible starting subframes as described above (e.g., the first step of the process), for example, based on counting valid downlink subframe and determining a starting subframe based on the repetitions levels. Then, the UE may determine which of the possible starting subframes to start monitoring an MPDCCH occasion (e.g., the second step of the process). For example, the UE may determine which of the possible starting subframes to monitor based on a UE identifier (UE-ID), such as a cell radio network temporary identifier (C-RNTI), and a hashing function. Based on the UE identification (e.g., C-RNTI), the UE may determine a subset of those subframes to monitor.

According to certain aspects, the starting subframe to monitor a MPDCCH occasion may be determined implicitly based on a discontinuous reception (DRX) configuration. For example, legacy LTE UEs are configured with a DRX cycle, such as to monitor PDCCH during 10 ms every 128 subframes. The starting subframe for monitoring MPDCCH occasion may be the same as the first monitoring subframe after the configured DRX period. According to certain aspects, the first starting MPDCCH may derived based on the DRX configuration and upcoming subsequent starting MPDCCH subframes may be determined as described above (e.g., every m valid subframes). Alternatively, the eNB may calculate the starting MPCCH monitoring subframe for a given UE. In this case, the eNB may configure the DRX cycle/offset based on the starting MPDCCH monitoring subframes so that they are aligned.

By applying the techniques provided in this disclosure for HARQ ID determination, determination of subframes for transmitting feedback (e.g., PUCCH), and determination of starting subframes to monitor MPDCCH occasions, improved HARQ may be performed, for example, for eMTC systems involving different coverage enhancement levels and uplink and downlink throughput may be increased.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Software is construed broadly to mean instructions, data, code, or any combination thereof, whether referred to as software, firmware, middleware, code, microcode, hardware description language, machine language, or otherwise. Generally, where there are operations illustrated in Figures, those operations may be performed by any suitable corresponding counterpart means-plus-function components.

For example, means for determining, performing, transmitting, receiving, and/or monitoring may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user equipment.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining a set of possible starting subframes for monitoring a machine type communication physical downlink control channel (MPDCCH) based on a pattern of available subframes and on one or more repetition levels of the MPDCCH, wherein the pattern of available subframes indicates one or more subframes as valid subframes and one or more subframes as invalid subframes; and
   monitoring the MPDCCH in one or more subframes of the set of possible starting subframes.

2. The method of claim 1, wherein:
   the one or more subframes comprises a subset of the set of possible starting subframes; and;
   the method further comprises determining the subset of the set of possible starting subframes for monitoring the MPDCCH based on a cell radio network temporary identifier (C-RNTI) and a hash function.

3. The method of claim 1, wherein:
   the one or more subframes comprises a subset of the set of possible starting subframes; and;
   the method further comprises determining the subset of the set of possible starting subframes for monitoring the MPDCCH based on a discontinuous reception (DRX) configuration.

4. An apparatus for wireless communications, comprising:
   means for determining a set of possible starting subframes for monitoring a machine type communication physical downlink control channel (MPDCCH) based on a pattern of available subframes and on one or more repetition levels of the MPDCCH, wherein the pattern of available subframes indicates one or more subframes as valid subframes and one or more subframes as invalid subframes; and
   means for monitoring the MPDCCH in one or more subframes of the set of possible starting subframes.

5. The apparatus of claim 4, wherein:
   the one or more subframes comprises a subset of the set of possible starting subframes; and;
   the apparatus further comprises means for determining the subset of the set of possible starting subframes for monitoring the MPDCCH based on a cell radio network temporary identifier (C-RNTI) and a hash function.

6. The apparatus of claim 4, wherein:
   the one or more subframes comprises a subset of the set of possible starting subframes; and;
   the apparatus further comprises means for determining the subset of the set of possible starting subframes for monitoring the MPDCCH based on a discontinuous reception (DRX) configuration.

7. An apparatus for wireless communications, comprising:
   at least one processor coupled with a memory, the memory comprising code executable by the at least one processor to cause the apparatus to:
   determine a set of possible starting subframes for monitoring a machine type communication physical downlink control channel (MPDCCH) based on a pattern of available subframes and on one or more repetition levels of the MPDCCH, wherein the pattern of available subframes indicates one or more subframes as valid subframes and one or more subframes as invalid subframes; and
   monitor the MPDCCH in one or more subframes of the set of possible starting subframes.

8. The apparatus of claim 7, wherein:
   the one or more subframes comprises a subset of the set of possible starting subframes; and;
   the memory further comprises code executable by the at least one processor to cause the apparatus to determine the subset of the set of possible starting subframes for monitoring the MPDCCH further based on a cell radio network temporary identifier (C-RNTI) and a hash function.

9. The apparatus of claim 7, wherein:
   the one or more subframes comprises a subset of the set of possible starting subframes; and;
   the memory further comprises code executable by the at least one processor to cause the apparatus to determine a subset of the set of possible starting subframes for monitoring the MPDCCH based on a discontinuous reception (DRX) configuration.

10. A non-transitory computer readable medium having code stored thereon for wireless communications by a user equipment (UE), the code executable by at least one processor to cause the UE to:
    determine a set of possible starting subframes for monitoring a machine type communication physical downlink control channel (MPDCCH) based on a pattern of available subframes and on one or more repetition levels of the MPDCCH, wherein the pattern of available subframes indicates one or more subframes as valid subframes and one or more subframes as invalid subframes; and
    monitor the MPDCCH in one or more subframes of the set of possible starting subframes.

11. The non-transitory computer readable medium of claim 10, wherein:
    the one or more subframes comprises a subset of the set of possible starting subframes; and;
    the code is further executable by the at least one processor to cause the UE to determine a subset of the set of possible starting subframes for monitoring the MPDCCH based on a cell radio network temporary identifier (C-RNTI) and a hash function.

12. The non-transitory computer readable medium of claim 10, wherein:
    the one or more subframes comprises a subset of the set of possible starting subframes; and;
    the code is further executable by the at least one processor to cause the UE to determine the subset of the set of possible starting subframes for monitoring the MPDCCH based on a discontinuous reception (DRX) configuration.

13. The method of claim 1, wherein determining the set of possible starting subframes based on the pattern of available subframes and on the one or more repetition levels of the MPDCCH comprises:

excluding subframes indicated as invalid by the pattern of available subframes;

determining a reference subframe; and determining the set of possible starting subframes as subframes occurring at a periodicity of a number of non-excluded available subframes starting from the reference subframe, the periodicity being equal to a largest repetition level of the one or more repetition levels of the MPDCCH.

14. The method of claim 13, wherein the reference subframe is defined with respect to an absolute radio frame boundary, is a function of a number of valid downlink (DL) subframes in a period, is defined in a wireless standard, is a function of a maximum MPDCCH repetition level, or a combination thereof.

15. The apparatus of claim 4, wherein the means for determining the set of possible starting subframes based on the pattern of available subframes and the repetition levels of the MPDCCH comprises:

means for excluding subframes indicated as invalid by the pattern of available subframes;

means for determining a reference subframe; and means for determining the set of possible starting subframes as subframes occurring at a periodicity of a number of non-excluded available subframes starting from the reference subframe, the periodicity being equal to a largest repetition level of the repetition levels of the MPDCCH.

16. The apparatus of claim 15, wherein the reference subframe is defined with respect to an absolute radio frame boundary, is a function of a number of valid downlink (DL) subframes in a period, is defined in a wireless standard, is a function of a maximum MPDCCH repetition level, or a combination thereof.

17. The apparatus of claim 7, wherein the code executable by the at least one processor to cause the apparatus to determine the set of possible starting subframes based on the pattern of available subframes and the one or more repetition levels of the MPDCCH comprises code executable by the at least one processor to cause the apparatus to:

exclude subframes indicated as invalid by the pattern of available subframes;

determine a reference subframe; and determine the set of possible starting subframes as subframes occurring at periodicity of a number of non-excluded available subframes starting from the reference subframe, the periodicity being equal to a largest repetition level of the one or more repetition levels of the MPDCCH.

18. The apparatus of claim 17, wherein the reference subframe is defined with respect to an absolute radio frame boundary, is a function of a number of valid downlink (DL) subframes in a period, is defined in a wireless standard, is a function of a maximum MPDCCH repetition level, or a combination thereof.

19. The non-transitory computer readable medium of claim 10, wherein the code executable by at least one processor to cause the UE to determine the set of possible starting subframes based on the pattern of available subframes and the one or more repetition levels of the MPDCCH comprises code executable by at least one processor to cause the UE to:

exclude subframes indicated as invalid by the pattern of available subframes;

determine a reference subframe; and determine the set of possible starting subframes as subframes occurring at periodicity of a number of non-excluded available subframes starting from the reference subframe, the periodicity being equal to a largest repetition level of the repetition levels of the MPDCCH.

20. The non-transitory computer readable medium of claim 19, wherein the reference subframe is defined with respect to an absolute radio frame boundary, is a function of a number of valid downlink (DL) subframes in a period, defined in a wireless standard, is a function of a maximum MPDCCH repetition level, or a combination thereof.

* * * * *